United States Patent
Shangguan

(10) Patent No.: US 7,979,738 B2
(45) Date of Patent: Jul. 12, 2011

(54) VIRTUAL TAPE LIBRARY BACKUP SYSTEMS, AND A METHOD OF HARD DISK DRIVE POWER CONTROL

(75) Inventor: Yinglan Shangguan, ShenZhen (CN)

(73) Assignee: Hangzhou H3C Technologies, Co., Ltd., Zhejiang (CN)

( * ) Notice: Subject to any disclaimer, the term of this patent is extended or adjusted under 35 U.S.C. 154(b) by 264 days.

(21) Appl. No.: 12/392,181

(22) Filed: Feb. 25, 2009

(65) Prior Publication Data

US 2010/0031080 A1   Feb. 4, 2010

(30) Foreign Application Priority Data

Jul. 30, 2008   (CN) .......................... 2008 1 0117449

(51) Int. Cl.
G06F 11/00   (2006.01)
(52) U.S. Cl. ...................................................... 714/6.21
(58) Field of Classification Search .................. 714/2–8, 714/13–16, 20–23, 25–27, 37–39, 42, 54
See application file for complete search history.

(56) References Cited

U.S. PATENT DOCUMENTS

| | | | |
|---|---|---|---|
| 7,076,606 B2* | 7/2006 | Orsley ........................... | 711/114 |
| 7,437,585 B2* | 10/2008 | Nakano et al. ................ | 713/330 |
| 7,454,656 B2* | 11/2008 | Okada et al. .................... | 714/22 |
| 2005/0114598 A1* | 5/2005 | Hartung et al. ............... | 711/114 |
| 2006/0174150 A1* | 8/2006 | Nakano et al. ................ | 713/330 |
| 2007/0250679 A1* | 10/2007 | Umemura et al. ............ | 711/170 |
| 2008/0126702 A1* | 5/2008 | Zimoto et al. ................ | 711/114 |
| 2008/0178041 A1* | 7/2008 | Takahashi et al. ............... | 714/6 |
| 2009/0147393 A1* | 6/2009 | Hakamata ....................... | 360/69 |
| 2009/0249104 A1* | 10/2009 | Ikeda et al. .................... | 713/324 |

* cited by examiner

Primary Examiner — Nadeem Iqbal

(57) ABSTRACT

The present invention discloses a virtual tape library (VTL) backup system, and a method of hard disk drive (HDD) power control in VTL devices. In the VTL backup system, a disk control module (DCM) is added to the VTL device and an agent module is added to the backup server. When a backup or disaster recovery (DR) operation is triggered, the agent module in the backup server can inform the disk control module (DCM) in the VTL device to trigger the VTL device to power on all the HDDs before the operation starts, and to power off all the HDDs after the operation ends. Power saving in the VTL device is achieved through power control over the HDDs.

20 Claims, 9 Drawing Sheets

VIRTUAL TAPE LIBRARY BACKUP SYSTEMS, AND A METHOD OF HARD DISK DRIVE POWER CONTROL

CROSS-REFERENCE TO RELATED APPLICATIONS

The present application claims priority to Chinese Patent Application CN 200810117449.0 filed in the PRC Patent Office on Jul. 30, 2008, the entire contents of which is incorporated herein by reference.

BACKGROUND

1. Field of the Invention

The present invention relates to a data storage technology and, more particularly, a virtual tape library (VTL) backup system, and a method of hard disk drive (HDD) power control in VTL devices.

2. Description of the Related Art

As a hard disk storage device, the VTL device comprises a storage controller (SC) and a Redundant Array of Independent Disks (RAID).

In the VTL device, the hard disk drives (HDDs) in the RAID array are the storage media; the SC comprises a RAID subsystem, which, serving as the RAID management module, handles the read/write operations on the data stored on the HDDs and provides redundant protection for data; the VTL application program configured on the SC shows the HDDs in the RAID array as virtual tapes to clients assigned to the VTL device.

Currently, VTL devices are often used to back up data. The clients of VTL devices are usually backup servers. A VTL device and a backup server together form a VTL backup system.

As shown in FIG. 1, in a VTL backup system, the backup server that serves as the client and the VTL device are connected through an Internet Protocol (IP) or Fiber Channel (FC) network and communicate with each other using the Internet SCSI (iSCSI) or FC protocol.

The backup server comprises a backup application module (BAM), which is an application program running on the backup server. When the BAM performs a backup operation, the backup data is written from the backup server to the storage media in the VTL device through an IP or FC network; when the BAM performs a disaster recovery (DR) operation, the data previously backed up is read from the VTL device and written back to the backup server through the IP or FC network.

As shown above, in a VTL backup system, data read/write operations occur in the VTL device only when the BAM performs backup/DR operations. In other words, the HDDs in the VTL device are idle for most of the time. Idle HDDs staying in the power-on state cause unnecessary power consumption of the VTL device.

To cut down power consumption, the Massive Arrays of Idle Disks (MAID) technology is often used to power on or power off specific HDDs, instead of all HDDs, in the RAID arrays of VTL devices.

To implement the MAID technology in a VTL backup system, you need to configure a few rotating HDDs in the VTL device as a cache. When the RAID subsystem in the SC receives a write or read request from the backup server, it checks whether the data required by the backup server is stored in the cache. If not, it powers on the HDD(s) corresponding to the write or read request, and records the access status of the HDD(s). On the other hand, if a power-on HDD stays in the idle state for a certain period of time, the RAID subsystem powers it off based on its recorded access status and the preconfigured power control policies. In other words, in a VTL device, only HDDs involved in ongoing write or read operations are powered on, while the rest of the HDDs stay in the power-off state. In this way, power consumption of the VTL device is lowered.

Although the use of the MAID technology lowers the power consumption of VTL devices, a few drawbacks do exist in the implementation of the technology:

1) The RAID subsystem in the VTL device needs to record the access status of each HDD in real time, which consumes a large amount of system resources in the VTL device;
2) The RAID subsystem in the VTL device needs to precisely identify the HDD corresponding to the virtual tape that is being accessed and control its power-on and power-off states. This poses high requirements on the reliability of the RAID subsystem and involves complex implementation procedures;
3) Because the HDDs in the VTL device are idle for most of the time, the cache usage is lower. Configuring a few HDDs as a cache is actually a waste of hardware resources;
4) Due to the inherent attributes of HDDs, powering on an HDD always requires a considerable amount of time. For example, it takes 10 seconds to power on a Serial Advanced Technology Attachment (SATA) HDD. Therefore, if the BAM needs to wait for the HDD(s) to be powered on after it already starts a backup/DR operation, the overall performance of the VTL backup system will be compromised.

It can be concluded thereby that using the MAID technology to cut down the power consumption of a VTL device affects the overall performance of the VTL backup system, and consumes a large amount of system resources.

SUMMARY

The present invention provides a VTL backup system and a method of HDD power control in VTL devices, which helps in reducing the power consumption of VTL devices and saving resources.

An embodiment of the present invention comprises:

A VTL backup system, further comprising a VTL device and a backup server, wherein:

the VTL device comprises an SC and a RAID array formed by some HDDs;

the SC comprises a RAID management module, that is, the RAID subsystem, which handles the backup server's read/write operations targeted at the RAID array, and controls the power of all the HDDs;

the backup server comprises a backup application module (BAM), which writes data to the RAID array when a backup operation is triggered and reads data from the RAID array when a DR operation is triggered;

the SC further comprises a disk control module (DCM), and the backup server further comprises an Agent module, wherein:

the Agent, when a backup/DR operation is triggered on the BAM, sends to the DCM an operation-start notification;

when the backup/DR operation ends, sends to the DCM an operation-end notification;

when receiving from the DCM a success response to the operation-start notification, informs the BAM to start the backup/DR operation;

the DCM, upon receiving an operation-start notification, triggers the RAID subsystem to power on all the HDDs in the RAID array, and returns a success response to the Agent;

upon receiving an operation-end notification, triggers the RAID subsystem to power off all the HDDs in the RAID array.

Moreover, because the HDDs are already powered on before backup/DR operations start, the BAM does not need to wait for the HDDs to be powered on during each backup/DR operation. In this way, the overall performance of the VTL backup system is improved.

DETAILED DESCRIPTION

To more clearly explain the purpose, technical solutions, and merits of the present invention, this part makes a detailed description on the embodiment of the invention with the help of some diagrams.

Figure 1:
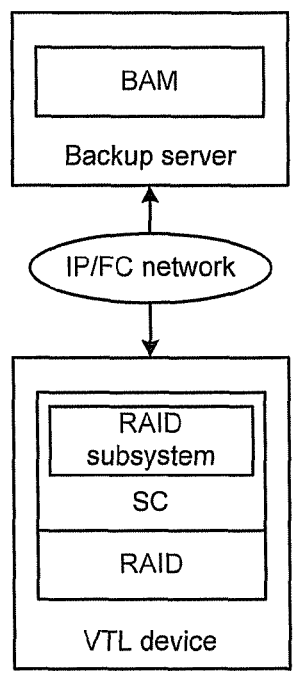
FIG. 1 is a schematic diagram illustrating a commonly-used VTL backup system.
Figure 2:
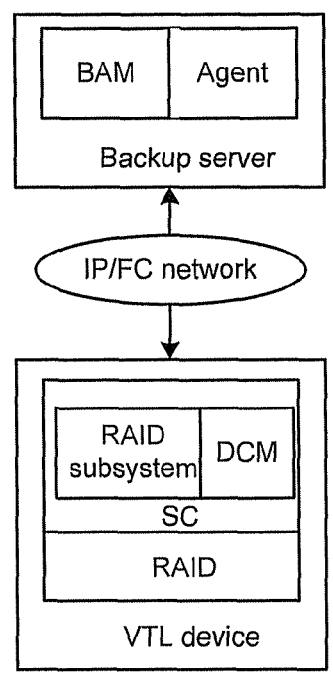
FIG. 2 is a schematic diagram illustrating the VTL backup system of the present invention.

By comparing FIG. 2 to FIG. 1, we can see that in a VTL backup system of the present invention shown in FIG. 2, a Disk Control Module (DCM) is added in the SC of the VTL device, and an Agent module is added in the backup server.

As an application program running on the backup server, the Agent can communicate directly with the DCM in the SC through an application layer interface, be invoked by the backup application module (BAM), and send operation-start or operation-end notifications to the DCM when backup/DR operations are triggered or ended on the BAM.

As a daemon program ever running on the VTL device, the DCM triggers the VTL device to power on or off the HDDs in its RAID array according to the notifications sent by the Agent, and responds to these notifications.

Figure 3:
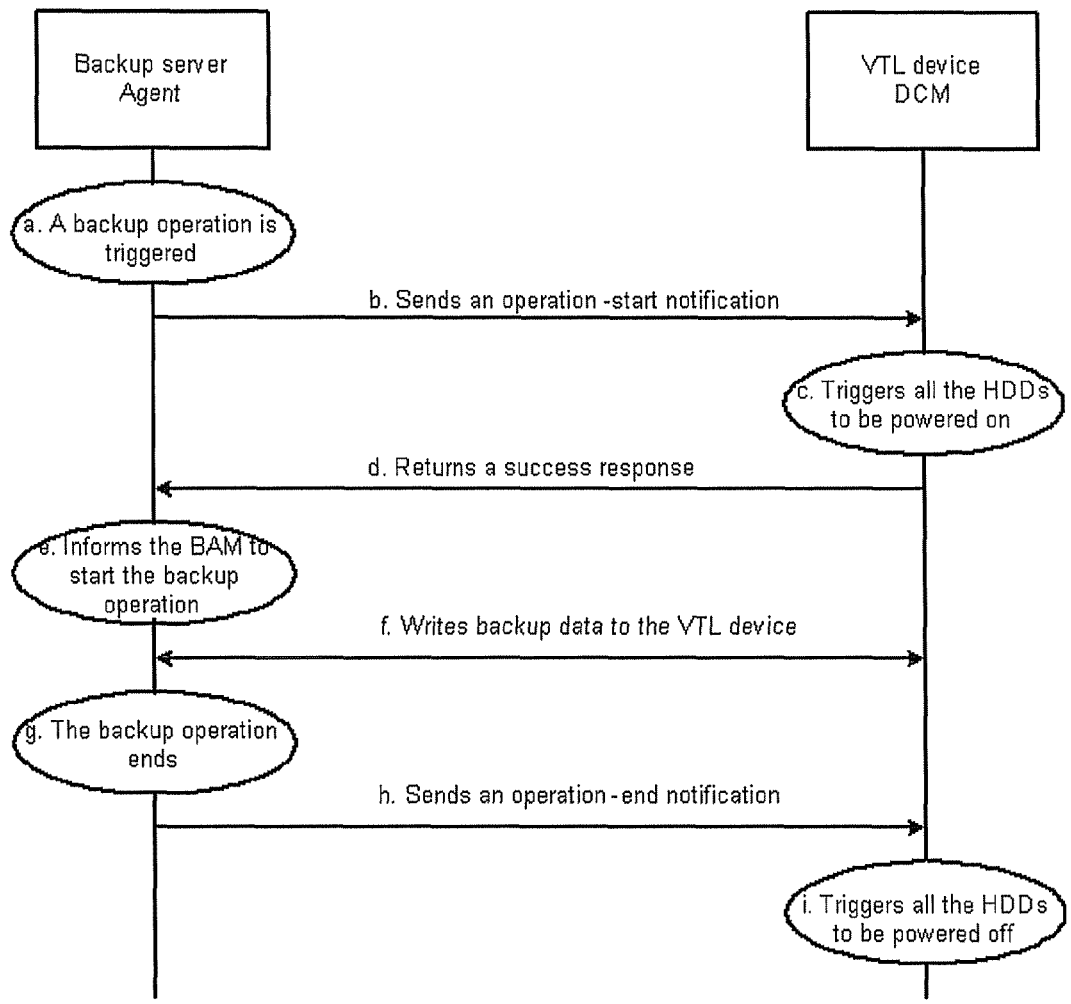
FIG. 3 is a schematic diagram illustrating the communications between the backup server and the VTL device of the VTL backup system.

The procedure of communication between the Agent and the DCM is shown in FIG. 3. Because the Agent-DCM communication procedures are the same during backup and DR operations, FIG. 3 only shows the Agent-DCM communication procedure during backup operations. As shown in FIG. 3:

a. The BAM invokes the Agent when a backup operation is triggered;

b. When the Agent is invoked, it sends an operation-start notification to the DCM;

c. The DCM triggers the VTL device to power on all the HDDs in its RAID array;

d. If all the HDDs in the RAID array are successfully powered on, the DCM returns a success response to the Agent;

e. After recognizing the success response, the Agent informs the BAM to start the backup operation;

f. The backup server backs up data to the VTL device;

g. When the backup operation ends, the BAM invokes the Agent again;

h. When the Agent is invoked, it sends an operation-end notification to the DCM;

i. The DCM triggers the VTL device to power off all the HDDs in its RAID array;

On the other hand, if the VTL device fails to power on all the HDDs in the RAID array, the DCM returns a failure response to the Agent, which, after recognizing the failure response, informs the BAM to abort the backup operation. Note that, the BAM will not start a backup/DR operation even if only one HDD in the RAID array fails to be powered on.

In this way, the Agent can initiate communication with the DCM when a backup/DR operation is triggered, to inform the DCM in the VTL device to trigger the VTL device to power on all the HDDs before the operation starts, and power off all the HDDs when the operation ends. The VTL device does not need to record the access status of each HDD in real time or identify the HDD(s) corresponding to each virtual tape that is being accessed, and there is no need to configure a few HDDs as a cache in the VTL device. Power saving in the VTL device is achieved through power control over the HDDs.

Moreover, because the HDDs are already powered on before backup/DR operations start, the BAM does not need to wait for the HDDs to be powered on during each backup/DR operation. In this way, mistakes that may occur during the waiting periods can be avoided, thus improving the overall performance of the VTL backup system.

Figure 4A:
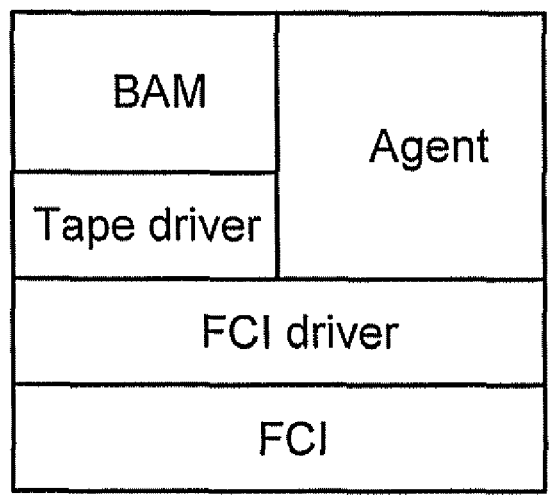
FIG. 4a is a schematic diagram illustrating the backup server and some neighboring modules involved in read/write operations in the VTL backup system.

The following describes in details the VTL backup system disclosed in the present invention by showing the internal structure of the backup server and the VTL device. FIG. 4a is a schematic diagram illustrating the backup server and some neighboring modules involved in read/write operations in the VTL backup system. As shown in FIG. 4a, the backup server comprises the BAM, tape driver, First Communication Interface (FCI), First Communication Interface (FCI) driver, and Agent, wherein the tape driver, FCI, and FCI driver are the same as those used in current VTL backup systems.

The BAM, when a backup/DR operation is triggered on it, invokes the Agent; upon receiving a notification from the Agent, starts or aborts the backup/DR operation; when the backup/DR operation ends, invokes the Agent again; wherein the BAM can invoke the Agent through its script.

Connected to the DCM in the VTL device through an application layer interface, the Agent, after being invoked by the BAM when a backup/DR operation is triggered, sends an operation-start notification to the DCM through the application layer interface to inform the DCM to trigger the VTL device to power on all the HDDs in its RAID array; upon receiving a success response or failure response from the DCM through the application layer interface, inform the BAM to start or abort the backup/DR operation; after being invoked by the BAM when the backup/DR operation ends, sends an operation-end notification to the DCM through the application layer interface to inform the DCM to trigger the VTL device to power off all the HDDs in its RAID array. The physical layer transmission path from the Agent to the DCM traverses the FCI, an IP or FC network, and a physical layer interface on the VTL device.

As a GigabitEthernet interface, an FC interface, or a physical interface of any other type that connects the IP or FC network, the FCI, with the help of the FCI driver, transmits operation-start/operation-end notifications, and success/failure responses between the Agent and the DCM through the IP or FC network.

Further, the BAM recognizes the virtual tapes provided by the VTL device using the tape driver; when performing a backup operation, the BAM sends a write request and the backup data corresponding to this write request in tape format to the FCI through the FCI driver; when performing a DR operation, the BAM sends a read request in tape format to and receives the backup data corresponding to this read request from the FCI through the FCI driver.

The FCI transmits read/write requests, and the backup data corresponding to the write requests in tape format to the VTL device through the IP or FC network, and receives the backup data corresponding to the read requests in tape format from the VTL device and transmits it to the BAM.

Figure 4B:
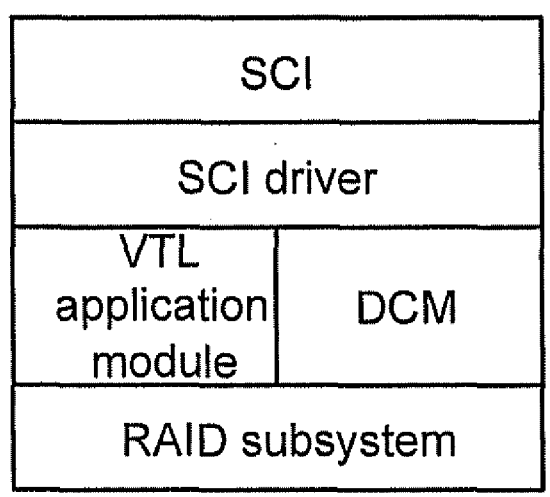
FIG. 4b is a schematic diagram illustrating the SC module inside the VTL device in the VTL backup system.

FIG. 4b is a schematic diagram illustrating the SC module inside the VTL device in the VTL backup system. As shown in FIG. 4b, the SC comprises the Second Communication Interface (SCI), Second Communication Interface (SCI) driver, VTL application program, RAID subsystem that serves as the RAID management module, and DCM, wherein the SCI, SCI driver, and VTL application program are the same as those used in current VTL backup systems.

As a GigabitEthernet interface, an FC interface, or a physical interface of any other type that connects the IP or FC network, the SCI, with the help of the SCI driver, transmits operation-start/operation-end notifications, and success/failure responses between the Agent and the DCM through the IP or FC network.

Connected to the Agent through an application layer interface and to the RAID subsystem through another application layer interface, the DCM, when receiving an operation-start notification from the Agent, triggers the RAID subsystem to power on all the HDDs in the RAID array through the application layer interface connecting the DCM and the RAID subsystem; after the RAID subsystem successfully powers on all the HDDs in the RAID array, examines the power-on state of the HDDs and returns a success response to the Agent through the application layer interface connecting the DCM and the Agent; when at least one HDD in the RAID array fails to be powered on, returns a failure response to the Agent through the application layer interface connecting the DCM and the Agent; when receiving an operation-end notification from the Agent, triggers the RAID subsystem to power off all the HDDs in the RAID array through the application layer interface connecting the DCM and the RAID subsystem.

The physical layer transmission path from the DCM to the Agent traverses the SCI, an IP or FC network, and the FCI on the backup server where the Agent resides.

The RAID subsystem powers on or off all the HDDs in the RAID array of the VTL device when triggered by the DCM, and notifies the DCM whether all the HDDs are successfully powered on.

Further, the SCI receives read/write requests and the backup data corresponding to the write requests in tape format from the backup server through the IP or FC network, and sends them to the VTL application program using the SCI driver; receives the backup data corresponding to the read requests in tape format from the VTL application program using the SCI driver and transmits it to the backup server through the IP or FC network.

The VTL application program shows the available storage space on the HDDs in the RAID array in the form of virtual tapes to the backup server; receives from the SCI read/write requests and the backup data corresponding to the write requests through the SCI driver, and converts them to disk format before transmitting them to the RAID subsystem; receives from the RAID subsystem the backup data corresponding to the read requests in disk format and transmits it to the SCI using the SCI driver.

The RAID subsystem, after receiving a read request in disk format from the VTL application program, retrieves the backup data corresponding to the read request in disk format from an HDD or multiple HDDs, and then transmits the data to the VTL application program; after receiving a write request in disk format from the VTL application program, writes the backup data corresponding to the write request to the corresponding HDD(s) in the RAID array.

Figure 5:
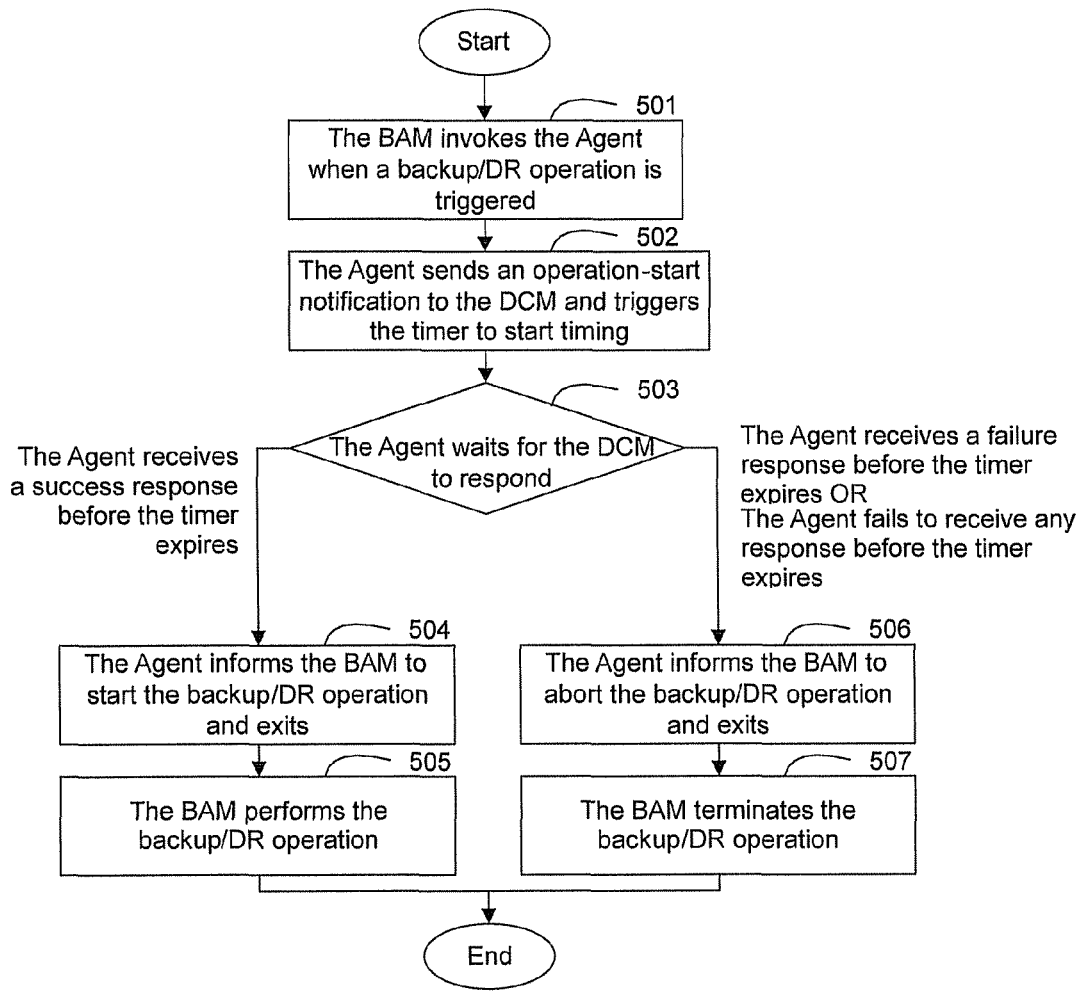
FIG. 5 is a flow chart illustrating how the backup server starts a backup/DR operation.

Further, to improve the reliability of the Agent shown in FIG. 4a, a timer is set on the Agent in the present invention. The Agent triggers the timer to start timing upon sending an operation-start notification; if a success response is received from the DCM before the timer expires, the Agent informs the BAM to start the backup/DR operation; otherwise, it informs the BAM to abort the operation. With an Agent configured with a timer, the backup server starts a backup/DR operation following these steps (refer to FIG. 5 for a general view):

At step 501, the BAM invokes the Agent when a backup/DR operation is triggered;

At step 502, the Agent sends an operation-start notification to the DCM in the VTL device and triggers the timer to start timing;

At step 503, the Agent waits for the response from the DCM. If a success response is received from the DCM before the timer expires, the Agent performs step 504; if a failure response is received from the DCM before the timer expires, or no response is received from the DCM before the timer expires, the Agent performs step 506;

At step 504, the Agent informs the BAM to start the backup/DR operation and then proceeds with step 505;

At step 505, the BAM performs the backup/DR operation. The procedure is over;

At step 506, the Agent informs the BAM to abort the backup/DR operation and then proceeds with step 507;

At step 507, the BAM aborts the backup/DR operation. The procedure is over.

Figure 6:
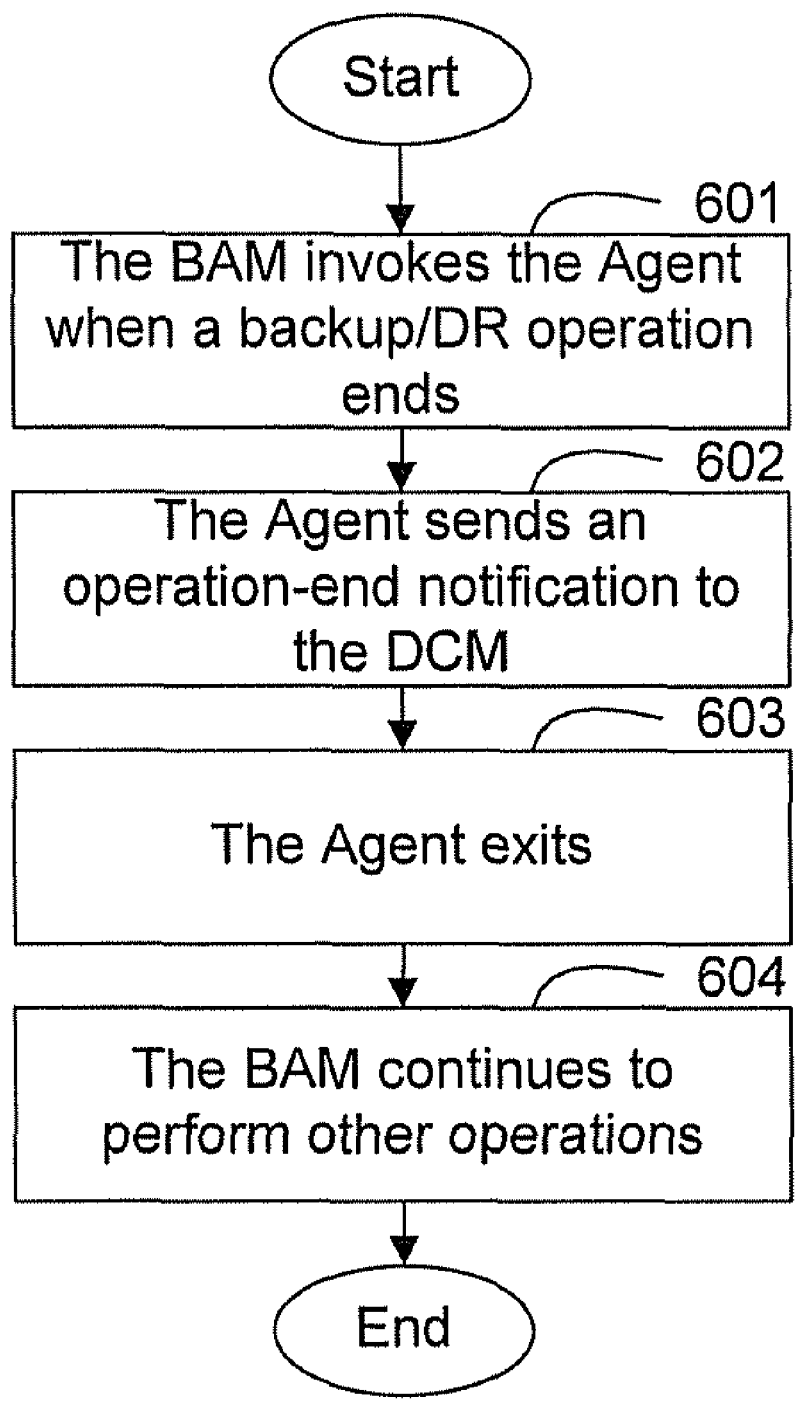
FIG. 6 is a flow chart illustrating how the backup server ends a backup/DR operation.

The procedure of the BAM ending a backup/DR operation does not involve the timer set on the Agent, as shown in FIG. 6:

At step 601, The BAM invokes the Agent when a backup/DR operation ends;

At step 602, the Agent sends an operation-end notification to the DCM in the VTL device;

At step 603, the Agent exits;

At step 604, the BAM continues to perform operations other than backup or DR. The procedure is over.

The DCM shown in FIG. 4b is a real time application program. To further facilitate backup implementation, a Global Power Status (GPS) parameter, that is, the First Parameter, is set on the DCM, wherein the value of GPS being 1 indicates that all the HDDs in the RAID array are powered on; being 0 indicates that at least one HDD in the RAID array fails to be powered on.

In this way, the DCM, upon receiving an operation-start notification from the Agent, examines the value of the GPS parameter, and if the value is 1, which indicates that all the HDDs in the RAID array are powered on, returns a success response to the Agent without triggering the RAID subsystem; if the value is 0, triggers the RAID subsystem to power on all the HDDs in the RAID array, returns a success response to the Agent if the RAID subsystem successfully powers on all the HDDs, and then sets the value of the GPS parameter to 1; upon receiving an operation-end notification, triggers the RAID subsystem to power off all the HDDs in the RAID array, and then sets the value of the GPS parameter to 0.

Figure 7:
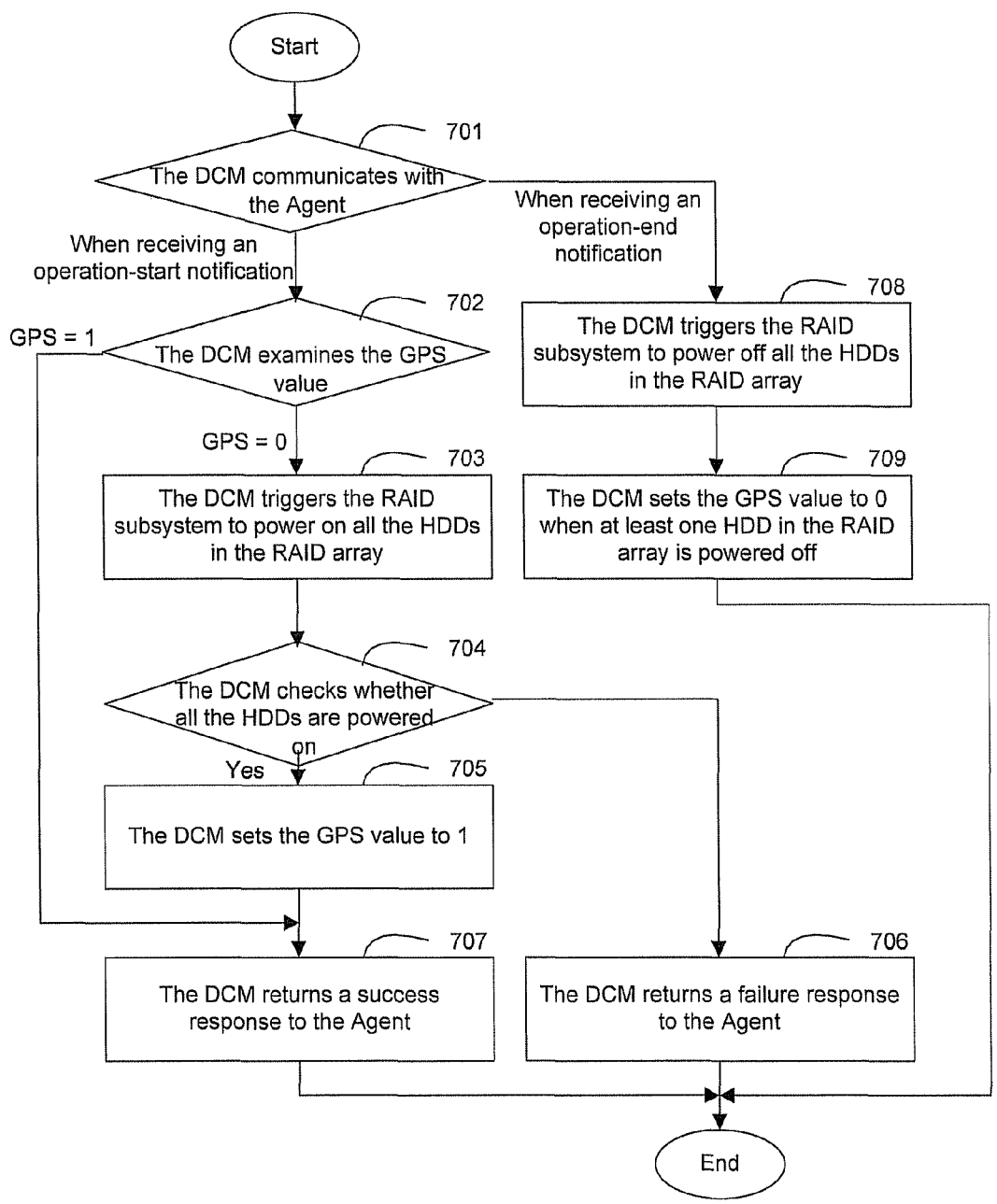
FIG. 7 is a flow chart illustrating how the SC module inside the VTL device works.

With the GPS parameter set on the DCM, the SC works as follows (refer to FIG. 7 for a general view):

At step 701, the DCM communicates with the Agent: when receiving an operation-start notification from the Agent, the DCM performs step 702; when receiving an operation-end notification from the Agent, the DCM performs step 708;

At step 702, the DCM examines the current value of the GPS parameter. If GPS=1, the DCM performs step 707; otherwise, it performs step 703;

At step 703, the DCM triggers the RAID subsystem to power on all the HDDs in the RAID array;

At step 704, the RAID subsystem checks whether all the HDDs in the RAID array are successfully powered on. If yes, the DCM performs step 705; if not, the DCM performs step 706;

At step 705, upon receiving from the RAID subsystem the check result that all the HDDs are powered on, the DCM sets the value of the GPS parameter to 1, and performs step 707;

At step 706, upon receiving from the RAID subsystem the check result that at least one HDD fails to be powered on, the DCM returns a failure response to the Agent. The procedure is over;

At step 707, the DCM returns a success response to the Agent. The procedure is over;

At step 708, the DCM triggers the RAID subsystem to power off all the HDDs in the RAID array, and then performs step 709;

At step 709, upon receiving from the RAID subsystem the check result that at least one HDD is successfully powered off, the DCM sets the value of the GPS parameter to 0. The procedure is over.

In the above procedure, the DCM may comprise a First Parameter submodule, a trigger control submodule, and a response generating submodule.

The trigger control submodule, when the DCM receives an operation-start notification, triggers the RAID subsystem to power on all the HDDs in the RAID array; when the DCM receives an operation-end notification, triggers the RAID subsystem to power off all the HDDs in the RAID array.

The response generating submodule, when the DCM receives from the RAID subsystem the check result that all the HDDs in the RAID array are powered on, sends a success response to the Agent; when the DCM receives from the RAID subsystem the check result that at least one HDD in the RAID array fails to be powered on, sends a failure response to the Agent.

The First Parameter submodule, with a GPS parameter set in it, receives operation-start and operation-end notifications from the Agent; when receiving an operation-start notification, examines the current value of the GPS parameter, sends the notification to the trigger control submodule if the GPS parameter value is 0, and then sets the GPS value to 1; when receiving an operation-end notification, sends the notification directly to the trigger control submodule, and set the GPS parameter value back to 0.

That is, the trigger control submodule does not receive operation-start and operation-end notifications directly from the Agent. Instead, it receives them from the First Parameter submodule.

If the GPS parameter value is already 1 when the First Parameter submodule receives an operation-start notification, indicating that all the HDDs in the RAID array are already powered on, the First Parameter submodule sends the operation-start notification to the response generating submodule, instead of the trigger control submodule.

The response generating submodule then sends a success response directly to the Agent upon receiving the operation-start notification.

Furthermore, considering that multiple concurrent backup/DR operations may exist on the BAM and that these operations may overlap completely or partially in time, the present invention sets a Parallel Job (PJ) parameter, that is, the Second Parameter, on the DCM. The current value of the PJ parameter indicates the total number of the ongoing backup/DR operations on the BAM.

When the DCM receives an operation-start notification from the Agent, it examines the current value of the PJ parameter. If the PJ parameter value is larger than 0, it indicates that backup/DR operations are being performed and all the HDDs in the RAID array are in the power-on state. Meantime, the current value of the GPS parameter is definitely 1. Therefore, the DCM directly returns a success response to the Agent and adds 1 to the PJ parameter value without examining the GPS parameter value or triggering the RAID subsystem to power on all the HDDs in the RAID array; if the PJ parameter value is 0, it indicates that there is no ongoing backup/DR operation in the backup system. In this case, the DCM needs to further examine the GPS parameter value, the method of which has been described earlier. After receiving an operation-end notification from the Agent, the DCM subtracts 1 from the current value of the PJ parameter and then examines the PJ parameter value; if the PJ parameter value becomes 0 after being subtracted by 1, the DCM triggers the RAID subsystem to power off all the HDDs in the RAID array; if not, it indicates that there are still ongoing backup/DR operations in the backup system. In this case, the DCM does not trigger the RAID subsystem to power off all the HDDs in the RAID array. Instead, it waits for the next operation-end notification.

Figure 8:
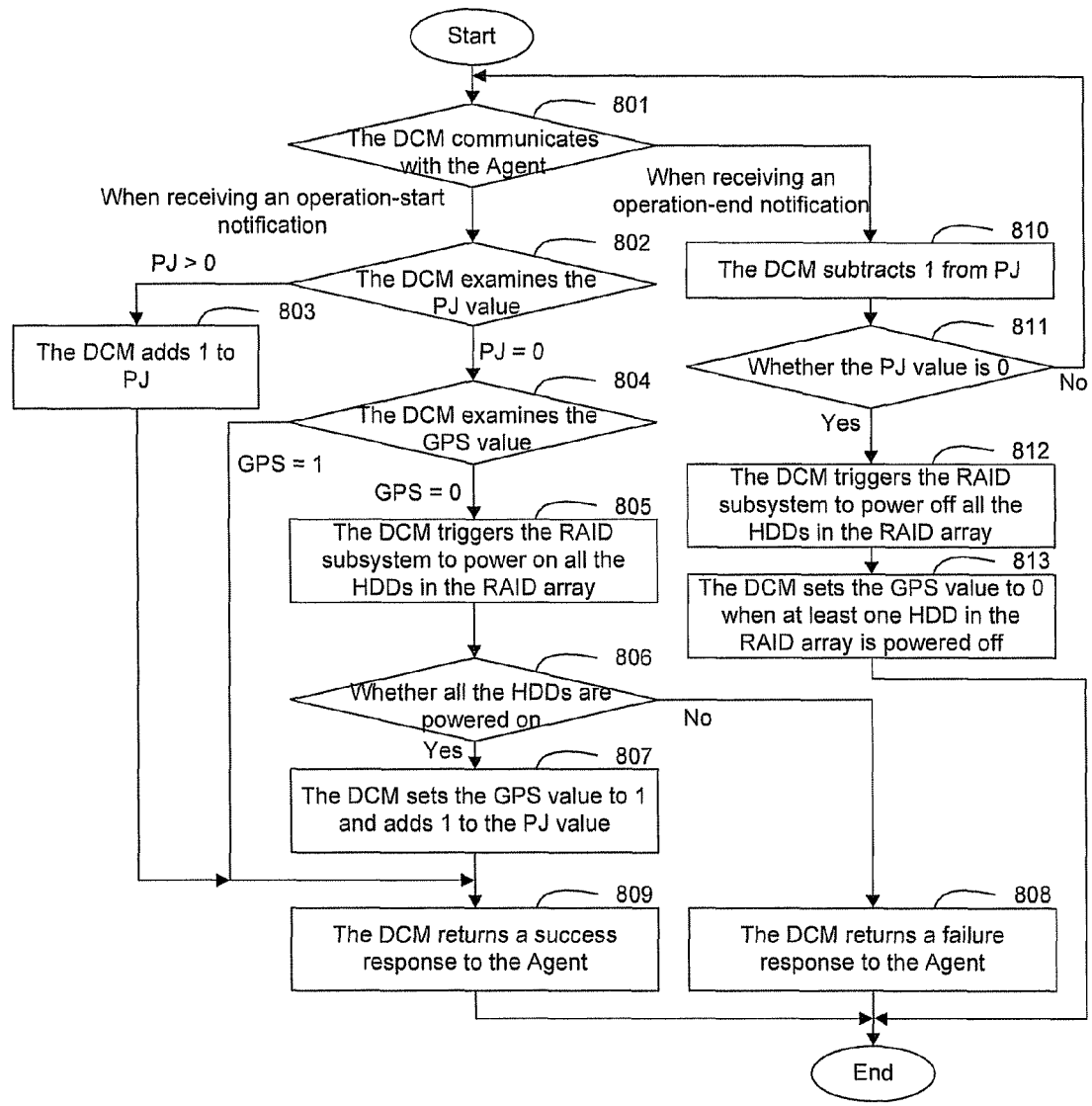
FIG. 8 is another flow chart illustrating how the SC module inside the VTL device works.

With the GPS and PJ parameters set on the DCM, the SC works as follows (refer to FIG. 8 for a general view):

At step 801 (the same as step 701), the DCM communicates with the Agent: when receiving an operation-start notification from the Agent, the DCM performs step 802; when receiving an operation-end notification from the Agent, the DCM performs step 810;

At step 802, the DCM examines the current value of the PJ parameter. If PJ>0, the DCM performs step 803; otherwise, it performs step 804;

At step 803, the DCM adds 1 to the PJ parameter value, and then performs step 809;

At step 804 (the same as step 702), the DCM examines the current value of the GPS parameter. If GPS=1, the DCM performs step 809; otherwise, it performs step 805;

At step 805 (the same as step 703), the DCM triggers the RAID subsystem to power on all the HDDs in the RAID array;

At step 806 (the same as step 704), the RAID subsystem examines whether all the HDDs in the RAID array are successfully powered on. If yes, the DCM performs step 807; if not, it performs step 808;

At step 807, the DCM sets the GPS parameter value to 1, adds 1 to the PJ parameter value, and then performs step 809;

At step 808 (the same as step 706), the DCM returns a failure response to the Agent. The procedure is over;

At step 809 (the same as step 707), the DCM returns a success response to the Agent. The procedure is over;

At step 810, the DCM subtracts 1 from the PJ parameter value, and then performs step 811;

At step 811, the DCM checks whether the PJ parameter value becomes 0 after being subtracted by 1 in step 810; if yes, it performs step 812; if not, it performs step 801;

At step 812 (the same as step 708), the DCM triggers the RAID subsystem to power off all the HDDs in the RAID array, and then performs step 813;

At step 813 (the same as step 709), at least one HDD in the RAID array is successfully powered off. The DCM sets the GPS parameter value to 0. The procedure is over.

In the above case, the DCM can further include a Second Parameter submodule, in which the PJ parameter is set. The Second Parameter submodule receives operation-start and operation-end notifications directly from the Agent. When receiving an operation-start notification, the Second Parameter submodule checks whether the current value of the PJ parameter is 0. If yes, it sends the operation-start notification to the First Parameter submodule, and adds 1 to the PJ parameter value; otherwise, because the PJ parameter value being larger than 0 indicates that the GPS parameter value is 1, it sends the notification directly to the response generating submodule, instead of the First Parameter submodule. When receiving an operation-end notification, the Second Parameter submodule subtracts 1 from the current PJ parameter value, and sends the notification to the First Parameter submodule if the PJ parameter value becomes 0.

That is, the First Parameter submodule does not receive operation-start and operation-end notifications directly from the Agent either. Instead, it receives them from the Second Parameter submodule.

The above is a detailed description of the VTL backup system in accordance with the present invention. The following is a detailed description of the method of HDD power control in VTL devices.

Figure 9:
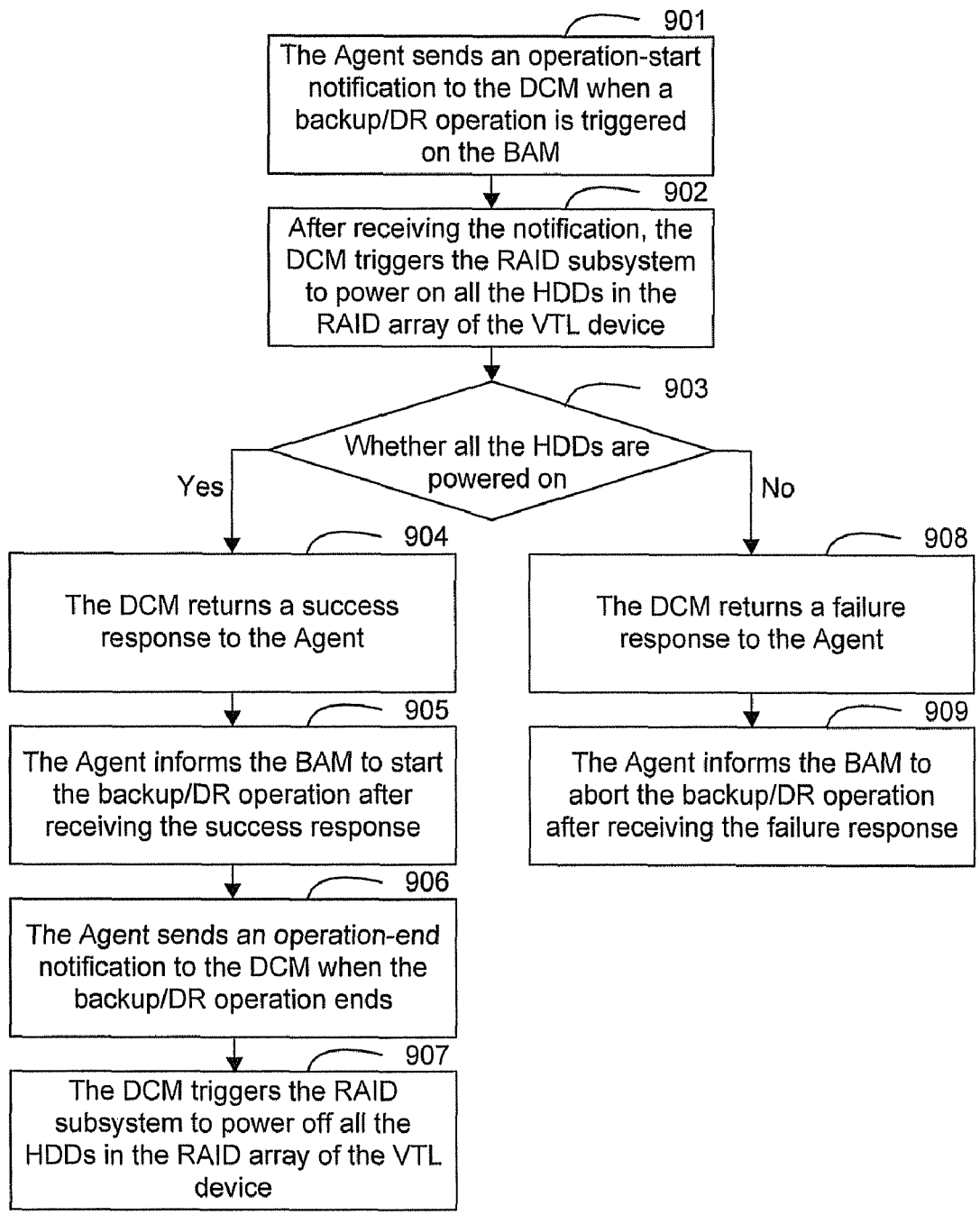
FIG. 9 is a flow chart illustrating the method of HDD power control in the VTL device of the VTL backup system.

FIG. 9 is flow chart illustrating the method of HDD power control in the VTL device of the VTL backup system in accordance with the present invention; as shown in FIG. 9, the method of HDD power control in the VTL device of the VTL backup system shown in FIG. 2 involves the following procedure:

At step 901, when a backup/DR operation is triggered on the BAM, the Agent sends an operation-start notification to the DCM;

At step 902, when receiving the operation-start notification, the DCM triggers the RAID subsystem in the VTL device to power on all the HDDs in the RAID array;

At step 903, the DCM decides whether all the HDDs in the RAID array are successfully powered on based on the check result returned by the RAID subsystem. If yes, it performs step 904; otherwise, it perform step 906;

At step 904, all the HDDs in the RAID array of the VTL device are successfully powered on. After receiving a success response from the DCM, the Agent performs step 905;

At step 905, the Agent informs the BAM to start the backup/DR operation after receiving the success response and then performs step 906;

In the backup server of the VTL backup system, a timer can be further set on the Agent. Upon sending an operation-start notification, the Agent triggers the timer to start timing. If the Agent fails to receive a success response from the DCM before the timer expires, it informs the BAM to abort the backup/DR operation.

At step 906, when a backup/DR operation ends, the Agent sends an operation-end notification to the DCM and then performs step 907;

At step 907, after receiving the operation-end notification, the DCM triggers the RAID subsystem in the VTL device to power off all the HDDs in the RAID array. The procedure is over;

At step 908, at least one HDD in the RAID array of the VTL device fails to be powered on. After receiving a failure response from the DCM, the Agent performs step 909;

At step 909, the Agent informs the BAM to abort the backup/DR operation after receiving the failure response and then exits.

The procedure is over.

The above procedure applies to a single backup/DR operation scenario. For multiple concurrent backup/DR operations, multiple such procedures are performed at the same time.

Before the above procedure, a Global Power Status (GPS) parameter can be further set on the DCM, wherein, the value of GPS being 1 indicates that all the HDDs in the RAID array are powered on; being 0 indicates that at least one HDD in the RAID array fails to be powered on.

Figure 10:
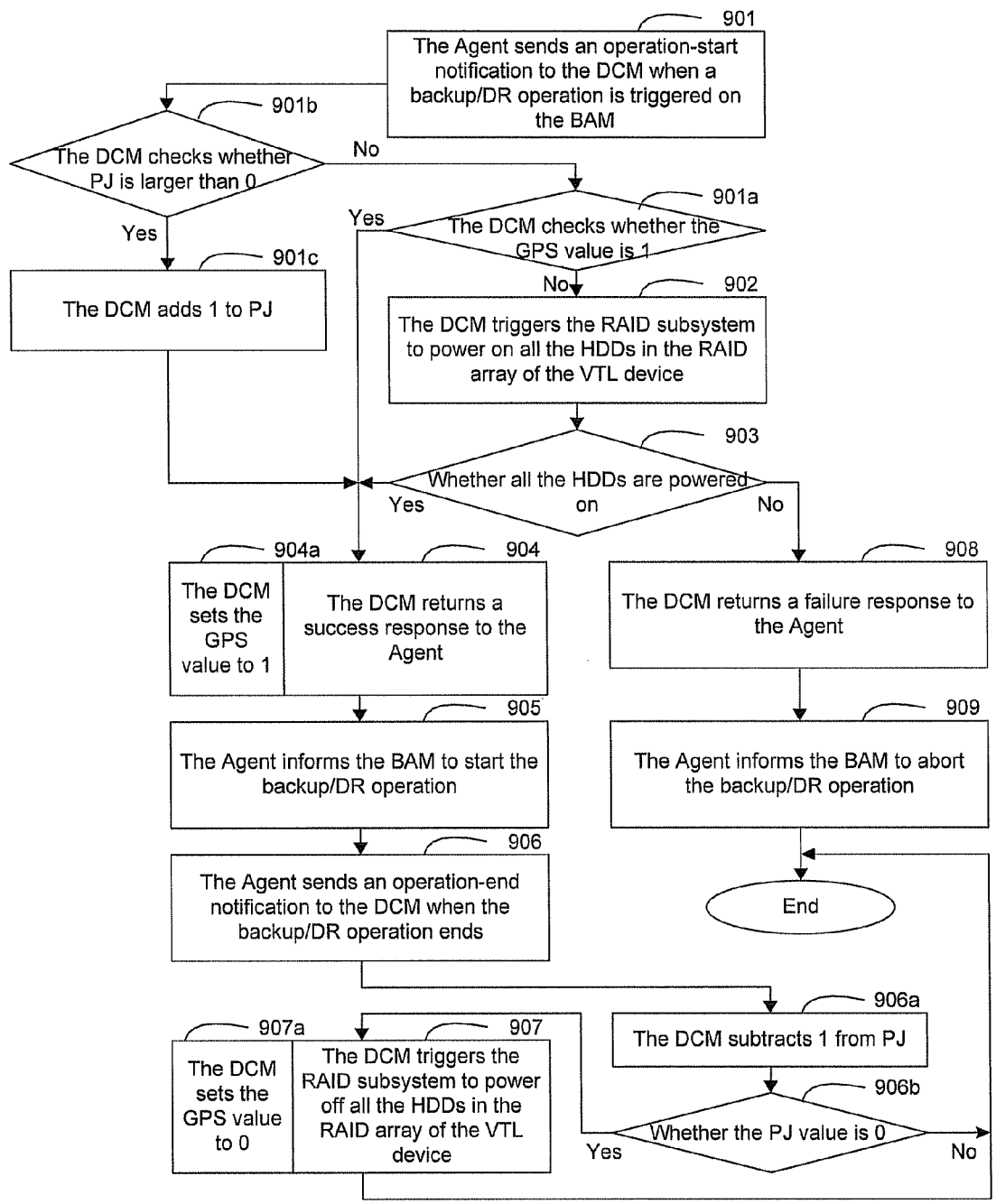
FIG. 10 is a flow chart illustrating the detailed procedure of HDD power control in the VTL device of the VTL backup system.

As shown in FIG. 10, after step 901 and before step 902, the DCM can further perform step 901a to check whether the GPS parameter value is 1. If yes, the DCM can perform step 904 directly, skipping steps 902 and 903. Otherwise, the DCM needs to perform steps 902 and 903; besides, at step 904, the DCM needs to further perform step 904a to set the GPS parameter value to 1. At step 907, the DCM needs to perform step 907a to set the GPS parameter value back to 0.

Further, when the GPS parameter is set in the DCM, considering that multiple concurrent backup/DR operations may exist on the BAM and that these operations may overlap completely or partially in time, a Parallel Job (PJ) parameter can be set on the DCM before the above procedure starts. The current value of the PJ parameter indicates the total number of the ongoing backup/DR operations on the BAM.

As shown in FIG. 10, after step 901 and before step 901a, the DCM can further perform step 901b to check whether the value of the PJ parameter is larger than 0; if yes, the DCM performs 901c to add 1 to the PJ parameter value, skipping steps 901a, 902, and 903, and performs step 904; otherwise, it cannot skip any step. Besides, after step 906 and before step 907, the DCM can further perform step 906a to subtract 1 from the PJ parameter value, step 906b to check whether the PJ parameter value is 0 after the subtraction, and then steps 907 and 907a if the PJ parameter value becomes 0 at step 906b. If the PJ parameter value does not become 0 at step 906b, the procedure is over at step 906b.

The procedure shown in FIG. 10 applies to a single backup/DR operation scenario. For multiple concurrent backup/DR operations, multiple such procedures are performed at the same time.

Although the present invention has been described in details, it is to be understood that the invention is not limited thereto, and that various modifications, alternate constructions, and equivalents can be made therein without departing from the spirit and scope of the invention, which is defined by the attached claims.

What is claimed is:

1. A virtual tape library (VTL) backup system, comprising:
 a VTL device comprising a disk control module (DCM), a redundant array of independent disks (RAID) including a plurality of hard-disk drives (HDDs), and a RAID management module configured to perform read/write operations targeted at the RAID and to control a power state of the plurality of HDDs included in the RAID; and a backup server comprising a backup application module (BAM) configured to send data to the VTL device when a backup operation is triggered and to read data from the VTL device when a disaster-recovery (DR) operation is triggered, and further comprising an agent module configured to communicate with the DCM;

wherein the agent module is configured to (i) send an operation-start notification to the DCM when a backup operation and/or DR operation is triggered at the BAM, (ii) send an operation-start notification to the BAM in response to receipt of a success response from the DCM, and (iii) send an operation-end notification to the DCM when the backup operation and/or DR operation ends; and wherein the DCM is configured to trigger the RAID management module to power on all of the plurality of HDDs in the RAID array in response to receiving the operation-start notification and to return a success response to the agent module in response to determining that all of the plurality of HDDs are powered on, and is further configured to trigger the RAID management module to power off all of the plurality of HDDs in the RAID array in response to receiving the operation-end notification.

2. The system of claim 1, wherein the backup server further comprises a timer configured to start timing when the agent module sends the operation-start notification corresponding to the backup and/or DR operation;

wherein if the success response is received from the DCM before the timer expires, the agent module is configured to inform the BAM to start the corresponding backup and/or DR operation; and wherein if the timer expires before the success response is received from the DCM, the agent module is configured to inform the BAM to abort the corresponding backup and/or DR operation.

3. The system of claim 1, wherein the RAID management module is further configured to determine that one or more of the plurality of HDDs failed to power on, and to send the failure result to the agent module via the DCM; and wherein the agent module is configured to inform the BAM to abort the corresponding backup and/or DR operation in response to receiving the failure result.

4. The system of claim 3, wherein the DCM is configured to maintain a first parameter indicating whether all the HDDs in the RAID array are currently powered on, and wherein the DCM is further configured to examine the current value of the first parameter before it triggers the RAID management module to power on all the HDDs in the RAID array;

wherein the DCM is configured to trigger the RAID management module to power on all the HDDs in the RAID array if the current value of the first parameter indicates that not all the HDDs in the RAID array are already powered on and to set the first parameter to a value indicating that all the HDDs are currently powered on; and wherein the DCM is further configured to return the success response to the agent module if the current value of the first parameter indicates that all the HDDs in the RAID array are currently powered on, without triggering the RAID management module to power on all the HDDs in the RAID array.

5. The system of claim 4, wherein the DCM is further configured to trigger the RAID management module to power off all the HDDs in the RAID array and set the first parameter to a value indicating that not all the HDDs are powered on in response to receiving an operation-end notification from the agent module and determining that the current value of the first parameter indicates that all of the HDDs are currently powered on.

6. The system of claim 4, wherein the DCM is configured to (i) maintain a second parameter indicating a number of ongoing backup and/or DR operations, (ii) examine the value of the second parameter before examining the value of the first parameter, (iii) examine the value of the first parameter when the current value of the second parameter indicates that there are no ongoing backup and/or DR operations, and (iv) return the success response to the agent module when the current value of the second parameter indicates that there is at least one ongoing backup and/or DR operation without checking the first parameter.

7. The system of claim 6, wherein:

the DCM is further configured to examine the current value of the second parameter in response to receipt of the operation-start notification and to then increase the current value of the second parameter, and is configured to decrease the current value of the second parameter in response to receipt of the operation-end notification; and wherein the DCM is configured to trigger the RAID management module to power off all the HDDs in the RAID array and set the first parameter to a value indicating that the HDDs in the RAID array are powered off in response to determining that the second parameter has reached a value indicating that there are no ongoing backup and/or DR operations.

8. A method of hard-disk drive (HDD) power control in virtual tape library (VTL) devices, wherein the VTL device comprises a disk control module (DCM), a redundant array of independent disks (RAID) subsystem comprising a plurality of HDDs, and the VTL device is connected to a backup server comprising a backup application module (BAM) and an agent module, wherein the HDD power control method comprises:

the agent module, when a backup and/or disaster-recovery (DR) operation is triggered on the BAM, sending an operation-start notification to the DCM;

the DCM triggering the RAID subsystem to power on all the HDDs in the RAID array in response to receiving the operation-start notification;

the DCM returning a success response to the agent module in response to determining that all of the HDDs in the RAID array powered-on properly;

the agent module informing the BAM to start the corresponding backup and/or DR operation in response to receiving the success response;

the agent module sending an operation-end notification to the DCM when the corresponding backup and/or DR operation ends;

the DCM triggering the RAID subsystem to power off all the HDDs in the RAID array in response to receiving the operation-end notification.

9. The method of claim 8, further comprising:

triggering a timer, via the agent module, to start timing in response to the operation-start notification being sent to the DCM;

determining, via the agent module, that the timer has expired before a success response is received from the DCM and informing, via the agent module, the BAM to abort the corresponding backup and/or DR operation.

10. The method of claim 8, wherein, responsive to determining that not all of the HDDs in the RAID array are powered-on properly, the DCM returning a failure response to the agent module; and wherein, responsive to receiving the failure response, the agent module informing the BAM to abort the corresponding backup and/or DR operation.

11. The method of claim 8, wherein a first parameter is set, the value of which indicates whether all of the HDDs in the RAID array are currently powered on;
   wherein the DCM examines the value of the first parameter and triggers the RAID subsystem to power on all the HDDs in the RAID array if the first parameter indicates that not all of the HDDs are currently powered on; and
   wherein the DCM does not trigger the RAID subsystem to power on all the HDDs in the RAID array but does return the success response if the first parameter value indicates that all the HDDs in the RAID array are currently powered on.

12. The method of claim 11, wherein:
   the DCM receives an operation-end notification, and in response, triggers the HDDs in the RAID array to power off all the HDDs and sets the first parameter to a value indicating that the HDDs are currently powered-off.

13. The method of claim 12, wherein the DCM further sets a second parameter that indicates a number of ongoing backup and/or DR operations;
   wherein the DCM, before examining the value of the first parameter, examines the value of the second parameter and if the value indicates that there is at least one ongoing backup and/or DR operation, sends the success message to the agent module without examining the first parameter, and if the value of the second parameter indicates that there is no ongoing backup and/or DR operations, the DCM proceeds to examine the value of the first parameter.

14. The method of claim 13, wherein the DCM, after examining the value of the second parameter, increases the value of the second parameter; and
   wherein, responsive to receipt of the operation-end notification, the DCM decreases the value of the second parameter.

15. A virtual tape library (VTL) device for providing storage service to a server, the VTL device comprising a storage controller (SC) and a disk array that includes a plurality of HDDs, the SC comprising:
   a disk array management module configured to execute read and write operations received from the server and targeted at the disk array, and to control a power state of all the HDDs contained in the array;
   a disk control module (DCM) configured to cause the disk array management module to power on all the HDDs in the disk array responsive to receiving an operation-start notification from the server, to return a success response to the server in response to determining that all of the HDDs in the disk array successfully powered-on, and to cause the disk array management module to power off all of the HDDs in the disk array responsive to receiving an operation-end notification from the server.

16. The VTL device of claim 15, wherein the DCM is configured to maintain a first parameter indicating whether all the HDDs in the disk array are currently powered on;
   wherein the DCM is configured to examine the value of the first parameter before triggering the disk array management module to power on all of the HDDs in the RAID array, such that the DCM triggers the disk array management module to power on all of the HDDs in the RAID array only if the value of the first parameter indicates that not all the HDDs in the disk array are powered on; and
   wherein the DCM is configured to return a success response to the server without triggering the disk array management module to power on all of the HDDs in the RAID array if the value of the first parameter indicates that all the HDDs in the disk array are already powered on.

17. The VTL device of claim 16, wherein the DCM is configured to trigger the disk array management module to power off all of the HDDs in the disk array and to set the first parameter to a value indicating that not all of the HDDs are powered on, in response to receipt of an operation-end notification from the server.

18. The VTL device of claim 16, wherein the DCM is configured to maintain a second parameter indicating a number of ongoing backup and/or recovery operations;
   wherein the DCM is configured to examine the value of the second parameter before examining the value of the first parameter;
   wherein the DCM is configured to examine the value of the first parameter when the value of the second parameter indicates that there are no ongoing backup and/or recovery operations; and
   wherein the DCM is configured to return a success response to the agent module when the value of the second parameter indicates that there is at least one ongoing backup and/or recovery operation, without examining the first parameter.

19. The VTL device of claim 18, wherein the DCM is further configured to increase the value of the second parameter responsive to receipt of the operation-start notification;
   wherein the DCM is further configured to decrease the value of the second parameter responsive to receipt of the operation-end notification; and
   wherein the DCM is further configured to trigger the disk array management module to power off all of the HDDs in the RAID array if the value of the second parameter indicates that there are no ongoing backup and/or recovery operations, and to set the first parameter to the value indicating that at least one HDD in the RAID array is powered off.

20. A server for performing backup operation comprising:
   a timer;
   a backup application module (BAM) configured to send data to a virtual tape library (VTL) backup system responsive to a backup operation being triggered and to read data from the VTL backup system responsive to a recovery operation is triggered; and
   an agent module configured to (i) communicate with a disk control module (DCM) within the VTL, (ii) send an operation-start notification in response to a backup and/or recovery operation being triggered and trigger the timer to start timing once the operation-start notification is sent, (iii) inform the BAM to start the corresponding backup and/or recovery operation if a success response to the operation-start notification is received from the DCM, and (iv) inform the BAM to abort the corresponding backup and/or DR operation if the success response to the operation-start notification is not received from the DCM before the timer expires.

* * * * *